(12) United States Patent
Elmore et al.

(10) Patent No.: US 11,187,303 B1
(45) Date of Patent: Nov. 30, 2021

(54) PLANETARY GEARBOX WITH A DISCONNECT ASSEMBLY

(71) Applicant: Fairfield Manufacturing Company, Inc., Lafayette, IN (US)

(72) Inventors: Patrick Dean Elmore, Zionsville, IN (US); Darren D. Arnold, Tulsa, OK (US); Shuo Zhang, West Lafayette, IN (US); Matthew P. Richards, West Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 0 days.

(21) Appl. No.: 17/013,934

(22) Filed: Sep. 8, 2020

(51) Int. Cl.
*F16H 1/28* (2006.01)
*F16H 3/00* (2006.01)
*F16H 3/66* (2006.01)

(52) U.S. Cl.
CPC ............... *F16H 3/002* (2013.01); *F16H 1/28* (2013.01); *F16H 3/66* (2013.01); *F16H 2200/2007* (2013.01)

(58) Field of Classification Search
CPC ... F16H 3/002; F16H 1/28; F16H 3/66; F16H 2200/2007; B25F 5/001
USPC ................................................ 475/298, 300
See application file for complete search history.

(56) References Cited

U.S. PATENT DOCUMENTS

| 5,011,341 | A | | 4/1991 | Degroff |
| 5,623,851 | A | | 4/1997 | Ooyama |
| 5,782,593 | A | | 7/1998 | Klement |
| 5,951,429 | A | * | 9/1999 | Eastman ............ B60K 17/3467 475/204 |
| 7,189,179 | B2 | * | 3/2007 | Williams ............. B60K 17/344 475/204 |
| 7,494,437 | B2 | * | 2/2009 | Chen ....................... B25B 21/02 173/216 |
| 2010/0179022 | A1 | | 7/2010 | Shirokoshi |

FOREIGN PATENT DOCUMENTS

| DE | 4201849 | | 12/1992 |
| SU | 1310251 A1 | * | 5/1987 |
| WO | 2017089144 | | 6/2017 |

* cited by examiner

*Primary Examiner* — Roger L Pang
(74) *Attorney, Agent, or Firm* — Marshall & Melhorn, LLC

(57) ABSTRACT

A planetary gearbox including a first planetary gear assembly, a second planetary gear assembly, and a disconnect assembly. The first planetary gear assembly includes a first sun gear, a first carrier, at least one first planet gear mounted in the first carrier, and a ring gear. The second planetary gear assembly includes a second sun gear, a second carrier, at least one second planet gear mounted in the second carrier, and the ring gear. The disconnect assembly includes a disconnect member and a connecting member. The disconnect member is coupled to the second carrier of the second planetary gear assembly, and the connecting member is coupled to both the disconnect member and the movable second sun gear.

17 Claims, 12 Drawing Sheets

PLANETARY GEARBOX WITH A DISCONNECT ASSEMBLY

FIELD

The presently disclosed subject matter relates to a planetary gearbox, and more particularly to a planetary gearbox with a disconnect assembly.

BACKGROUND

Conventional planetary gearboxes are attractive for their high linearity and efficiency. The planetary gearbox often includes a sun gear, a ring gear, at least one planet gear, and an output. Input power supplied by a prime mover (e.g. an electric motor) to the sun gear causes it to rotate. The planet gears mesh with the sun gear, and as the sun gear rotates, the planet gears rotate on their axes. The planet gears also mesh with the ring gear, which is stationary, causing the planet gears to revolve around the sun gear. The carrier holds the planet gears together and sets their spacing. It rotates with the planet gears.

In a planetary gearbox, many teeth are engaged at once, which allows high speed reduction to be achieved with relatively small gears and lower inertia reflected back to the prime mover. Having multiple teeth share the load also allows planetary gears to transmit high levels of torque. The combination of compact size, large speed reduction and high torque transmission makes planetary gearboxes a popular choice for space-constrained applications. But planetary gearboxes do have some disadvantages. Typical planetary gear boxes capable of operating in a tow mode or OFF mode include complex disconnect assemblies which require precision manufacturing. Such prior art disconnect assemblies consume valuable space within the planetary gearbox while adding significant production costs.

Although low-cost and compact disconnect assemblies are available and used in prior art planetary gearboxes, such assemblies usually are located and disconnect at a high-speed stage sun gear. More particularly, the planetary gearbox has a low-speed high-torque stage on an outbound side of the planetary gearbox and the high-speed sun gear on an inbound side, thereby making the high-speed stage disconnect assembly difficult to access. Another drawback of such prior art disconnect assemblies is it that they are not suitable for downsizing. Any reduction in size of the disconnect assembly renders the components too small to produce, handle and assemble.

In view of the above, it would be desirable to produce a planetary gearbox including a disconnect assembly capable of selectively disengaging a planetary gear assembly at a low-speed sun gear due to its large size and ease of access in order to operate in a tow mode or an OFF mode, yet the disconnect assembly is simple and cost effective.

SUMMARY

In concordance and agreement with the present disclosure, a planetary gearbox including a disconnect assembly capable of selectively disengaging a planetary gear assembly at a low-speed sun gear due to its large size and ease of access in order to operate in a tow mode or an OFF mode, yet is simple and cost effective, has surprisingly been discovered.

In one embodiment, a disconnect assembly, comprises: a disconnect member; and a connecting member including a first end and a second end, wherein the first end is coupled to the disconnect member and the second end is coupled to an axially movable sun gear of a planetary gear assembly.

As aspects of certain embodiments, the disconnect member is selectively positionable by an actuator.

As aspects of certain embodiments, the disconnect member includes external threads formed thereon.

As aspects of certain embodiments, the external threads of the disconnect member cooperate with internal threads formed on a carrier of the planetary gear assembly.

As aspects of certain embodiments, the disconnect assembly further comprises a biasing member disposed between disconnect member and the planetary gear assembly.

As aspects of certain embodiments, the biasing member is circumferentially disposed about the connecting member.

In another embodiment, a planetary gearbox, comprises: a planetary gear assembly including a movable sun gear, a carrier, at least one planet gear coupled to the carrier, and a ring gear; and a disconnect assembly including a disconnect member and a connecting member, wherein the disconnect member is threadably coupled to the carrier of the planetary gear assembly, and wherein the connecting member is coupled to the disconnect member and the movable sun gear.

As aspects of certain embodiments, the disconnect assembly is selectively positionable between an engaged position and a disengaged second position, wherein the disconnect assembly in the engaged position permits torque to be transferred through the planetary gear assembly to a working component, and wherein the disconnect assembly in the disengaged second position permits the planetary gearbox to free wheel without torque being transferred to the working component.

As aspects of certain embodiments, the planetary gearbox further comprises a biasing member disposed between the disconnect member and the movable sun gear of the planetary gear assembly.

As aspects of certain embodiments, the biasing member is circumferentially disposed about the connecting member.

In yet another embodiment, a planetary gearbox, comprises: a first planetary gear assembly including a first sun gear, a first carrier, at least one first planet gear coupled to the first carrier, and a ring gear; a second planetary gear assembly including a movable second sun gear coupled to the first planetary gear assembly, a second carrier, at least one second planet gear coupled to the second carrier, and the ring gear; and a disconnect assembly including a disconnect member and a connecting member, wherein the disconnect member is coupled to the second carrier of the second planetary gear assembly, and wherein the connecting member is coupled to the disconnect member and the movable second sun gear.

As aspects of certain embodiments, the second carrier of the second planetary assembly includes a linear stop formed thereon.

As aspects of certain embodiments, the disconnect member is threadably coupled to the second carrier of the second planetary gear assembly.

As aspects of certain embodiments, the disconnect member is selectively positionable by an actuator.

As aspects of certain embodiments, the connecting member includes a first end, an opposite second end, and a grooved formed therebetween.

As aspects of certain embodiments, the movable second sun gear includes a linear stop formed thereon.

As aspects of certain embodiments, the movable second sun gear is selectively positionable between an engaged position and a disengaged position. As aspects of certain embodiments, the movable second sun gear in the engaged position is in meshed engagement with the first carrier of the first planetary gear assembly and the at least one second planet gear of the second planetary gear assembly.

As aspects of certain embodiments, the movable second sun gear in the disengaged position is in meshed engagement with the at least one second planet gear of the second planetary gear assembly and separated from the first carrier of the first planetary gear assembly.

As aspects of certain embodiments, the planetary gearbox further comprises a biasing member having a first end disposed in a portion of the disconnect member and a second end disposed adjacent the movable second sun gear of the second planetary gear assembly.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
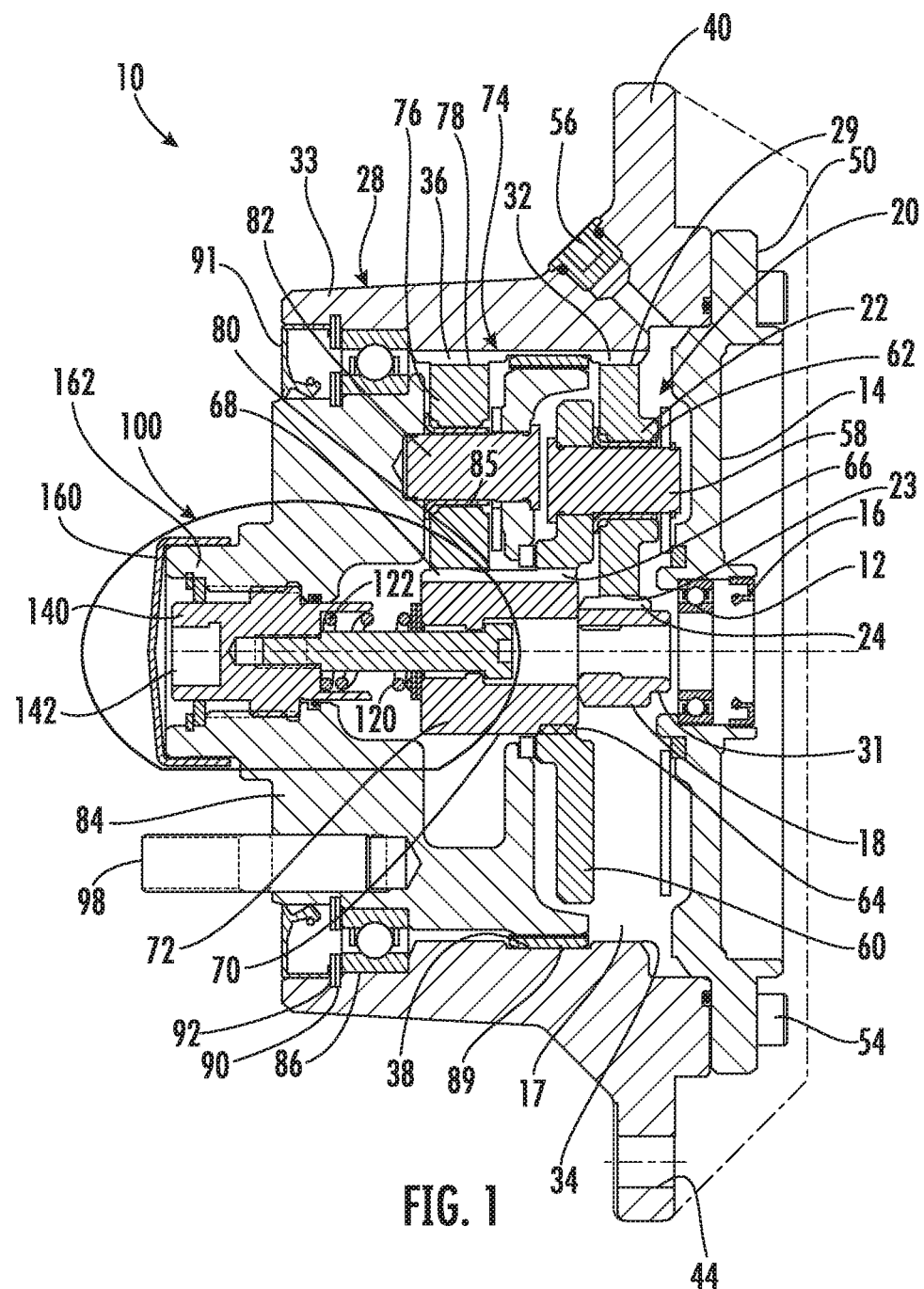
FIG. 1 is a cross-sectional view of a planetary gearbox according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIGS. 1 and 3-5 illustrate a planetary gearbox 10 according to an embodiment of the presently disclosed subject matter. It is understood that the planetary gearbox 10 may have commercial, industrial, locomotive, military, agricultural, and aerospace applications. For example, the planetary gearbox 10 may be employed in a lawn mower or a scissor lift device.

The planetary gearbox 10 may be connected to a prime mover (not depicted) in electrical communication with a power source (not depicted). The prime mover may be any suitable source of motive power as desired such as an electric motor, a hydraulic motor, an input adapter, and the like, for example. In one particular embodiment, the prime mover is a permanent magnet electric motor having a stator circumferentially disposed about a rotor.

A rotatable shaft (not depicted) being either an output shaft of the prime mover or an input shaft of the planetary gearbox 10 which is coupled to the prime mover for rotation therewith. The rotatable shaft may be supported in the planetary gearbox 10 by at least one bearing 12 disposed in an end portion 14 thereof. A sealing element 16 may be interposed between the rotatable shaft and the end portion 14 to militate against contaminants and other undesired materials and substances from damaging the bearing 12 and entering an interior 17 of the planetary gearbox 10. The rotatable shaft is drivingly connected to a first planetary gear assembly 20.

In certain embodiments, a first sun gear 18 of the first planetary gear assembly 20 is fixedly coupled to the rotatable shaft for rotation therewith.

Various methods may be employed to couple the first sun gear 18 to the rotatable shaft such as forging, welding, a splined engagement, and the like, for example. The first planetary gear assembly 20 may further comprise two or more first planet gears 22 in meshed engagement with the first sun gear 18. It is understood that the first planetary gear assembly 20 can include any number and size of first planet gears 22 as desired. Each of the first planet gears 22 may include a plurality of teeth 23 formed on an outer surface 29 that cooperate with a plurality of teeth 24 formed on a circumferential outer surface 31 of the first sun gear 18.

Figure 8:
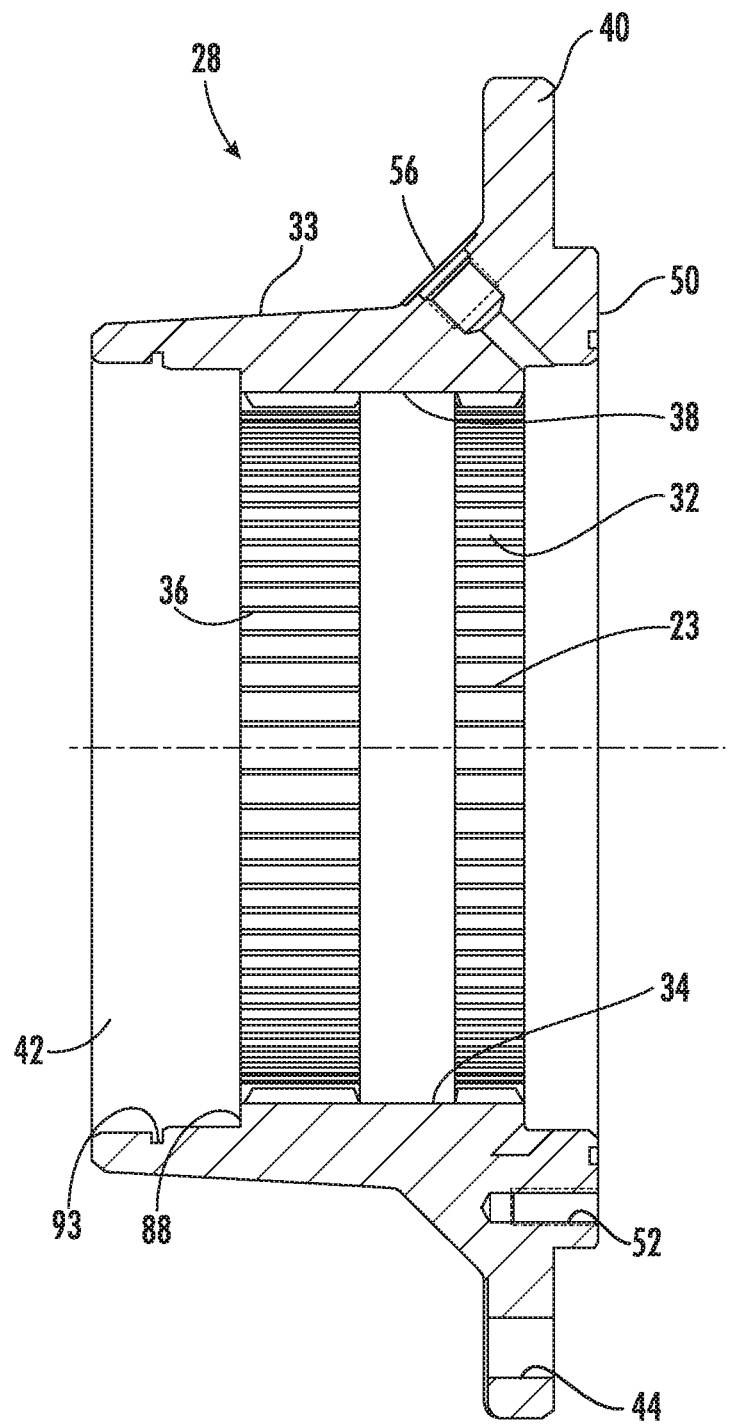
FIG. 8 is a cross-sectional view of the ring gear shown in FIGS. 6 and 7.

The first planet gears 22 may also be in meshed engagement with a ring gear 28 having a main body 33 disposed at least partially concentrically about the first planet gears 22 and the first sun gear 18. More preferably, the teeth 23 of the first planet gears 22 cooperate with a plurality of first teeth 32 formed on an inner surface 34 of the main body 33 of the ring gear 28. A plurality of second teeth 36 may be formed on the inner surface 34 of the ring gear 28. As illustrated in FIG. 8, the second teeth 36 may be spaced apart from the first teeth 32 forming an annular channel 38 therebetween. The channel 38, shown in FIG. 8, has a smooth continuous inner surface. In other embodiments, however, the channel 38 may be formed by removing a portion of the teeth 32, 36 cut into the ring gear 28 at a location intended for the channel 38, which results in the channel 38 having an interrupted inner surface.

Figure 6:
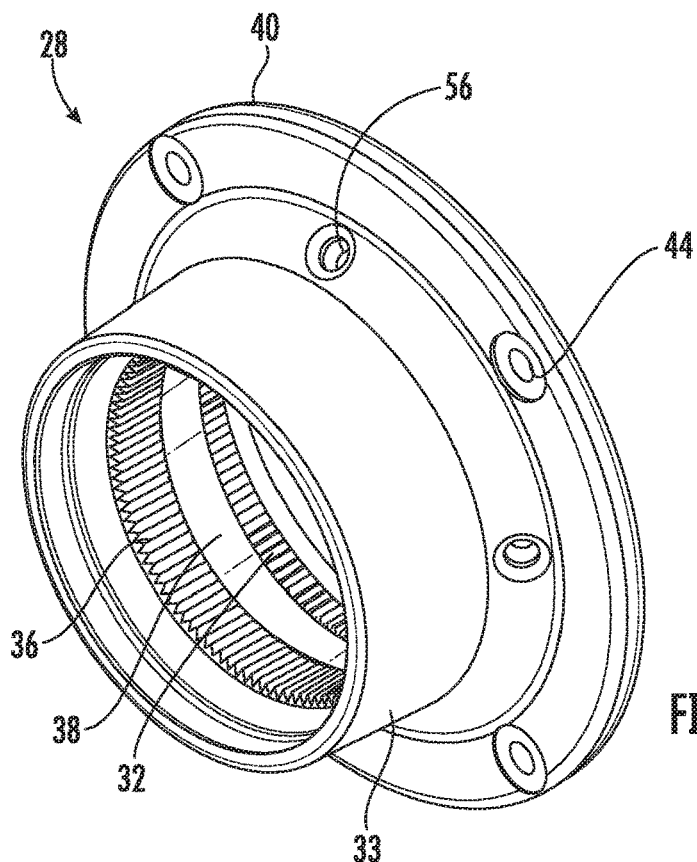
FIG. 6 is a front perspective view of a ring gear of the planetary gearbox shown in FIGS. 1 and 3-5.
Figure 7:
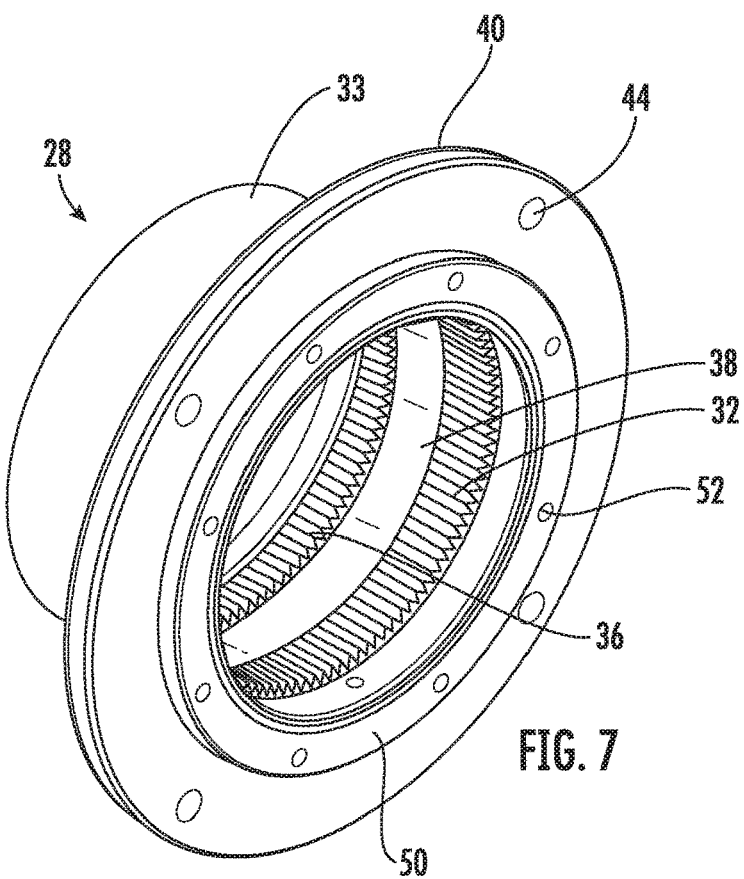
FIG. 7 is a rear perspective view of the ring gear shown in FIG. 6.

As more clearly shown in FIGS. 6-8, the main body 33 of the ring gear 28 is generally ring-shaped having an annular flange 40 formed thereon and a stepped center bore 42 form therethrough. The annular flange 40 is configured to cooperate with the stationary structure to maintain a position of the planetary gearbox 10. In certain embodiments, the annular flange 40 may include at least one aperture 44 configured to receive at least one fastener (not depicted) for removably coupling the ring gear 28 and planetary gearbox 10 to the stationary structure. Various other methods may be used to couple the ring gear 28 and the planetary gearbox 10 to the stationary structure such as welding, for example. The ring gear 28 may be fixedly coupled to a stationary structure (not depicted) or selectively coupled to the stationary structure via a clutch assembly (not depicted), if desired.

A first face 50 of the ring gear 28 is configured to mate with the end portion 14 of the planetary gearbox 10. In certain embodiments, the first face 50 may include at least one aperture 52 configured to receive at least one fastener 54 for coupling the end portion 14 to the ring gear 28. Various other methods may be used to couple the end portion 14 to the ring gear 28 such as welding, for example. At least one port 56 may be formed in the ring gear 28 to permit a flow of a lubricant (not depicted) to the interior 17 of the planetary gearbox 10.

Referring back to FIG. 1, the first planet gears 22 may be rotatably disposed on first planet pins 58 coupled with a first carrier 60. It is understood that the first planet gears 22 may be mounted at various positions on the first carrier 60. A bearing 62 (e.g. a needle bearing) may be interposed between each of the planet pins 58 and the respective first planet gears 22. In some embodiments, the first carrier 60 includes a plurality of teeth 64 formed on an inner surface 66 thereof that cooperate with a plurality teeth 68 formed on a circumferential outer surface 70 of a second sun gear 72 of a second planetary assembly 74. The second sun gear 72 may be movable in a first axial direction and in an opposite second axial direction. The second planetary gear assembly 74 may further comprise two or more second planet gears 76 in meshed engagement with the second sun gear 72. It is understood that the second planetary gear assembly 74 can include any number and size of second planet gears 76 as desired. Each of the second planet gears 76 may include a plurality of teeth 78 formed on an outer surface 80 that cooperate with the teeth 68 of the second sun gear 72.

The second planet gears 76 may also be in meshed engagement with the ring gear 28 disposed at least partially concentrically about the second planet gears 76 and the second sun gear 72. More preferably, the teeth 78 of the second planet gears 76 cooperate with the plurality of second teeth 36 formed on the inner surface 34 of the ring gear 28. The second planet gears 76 may be rotatably disposed on planet pins 82 coupled with a spindle or second carrier 84. It is understood that the second planet gears 76 may be mounted at various positions on the second carrier 84. A bearing 85 (e.g. a needle bearing) may be interposed between each of the planet pins 82 and the respective second planet gears 76.

In certain embodiments, the second carrier 84 may be rotatably supported within the planetary gearbox 10 via a bearing 86. As illustrated, the bearing 86 is interposed between the second carrier 84 and the ring gear 28. The bearing 86 may be disposed adjacent to and in abutment with a shoulder 88, shown in FIG. 8, formed by the stepped center bore 42 to militate against a movement of the bearing 86 in the first axial direction. A first retaining element 90 (i.e. a double-turn internal retaining ring) may be disposed adjacent the bearing 86 to militate against a movement of the bearing 86 in the opposite second axial direction. Additionally, a second retaining element 92 (i.e. a double-turn external retaining ring), shown in FIG. 1, may be disposed in a groove 93 formed in the second carrier 84, shown in FIG. 8, adjacent the first retaining element 90 to militate against a movement of the second carrier 84 further into the ring gear 28 and an interference therebetween. A sealing element 91 may be disposed adjacent the bearing 86 and between the second carrier 84 and the ring gear 28 to militate against contaminants and other undesired materials and substances from damaging the bearing 86 and entering the interior 17 of the planetary gearbox 10.

Figure 15:
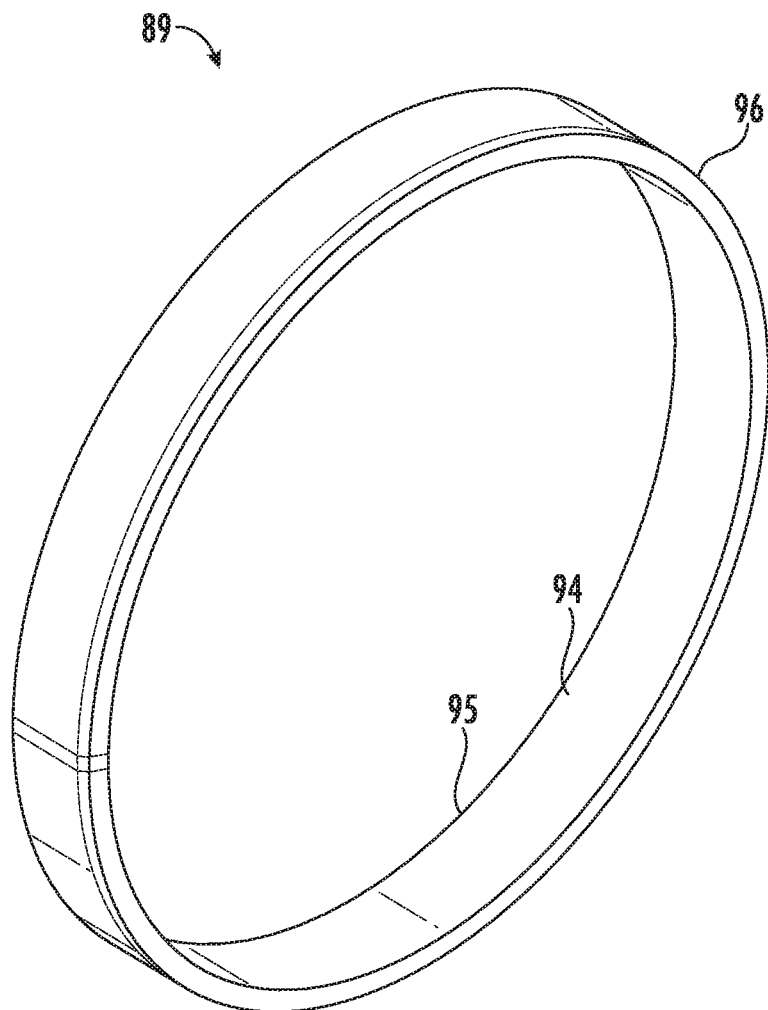
FIG. 15 is a rear perspective view a bushing of the planetary gearbox shown in FIG. 1.

The second carrier 84 may also be rotatably supported within the planetary gearbox 10 via a bushing 89. As illustrated, the bushing 89 is interposed between the second carrier 84 and the ring gear 28. More preferably, the bushing 89 is disposed in the annular channel 38 formed in the ring gear 28 having the first teeth 32 militate against a movement of the bushing 89 in the first axial direction and the second teeth 36 militate against a movement of the bushing 89 in the second axial direction. The bushing 89 may have any shape and size as desired such as generally ring-shaped, as shown in FIG. 15. It is understood that the bearing 86 and the bushing 89 may be produced from any suitable material as desired. As a non-limiting example, the bushing 89 may be produced from a sintered bronze with a steel backing. A non-friction coating 94 may be formed on at least one of a circumferential inner surface 95 and a circumferential outer surface 96 to minimize friction between the bushing 89 and at least one of the ring gear 28 and the second carrier 84, which is caused by a relative movement thereof. It is understood that the coating may be any suitable coating as desired such as a polytetrafluoroethylene (PTFE) coating, for example. It is further understood that any number of bearings 86 and bushings 89 can be employed in the planetary gearbox 10, as desired.

In certain embodiments, the bushing 89 includes split or open ends (not depicted). The split or open ends permit the bushing 89 to be temporarily collapsed during an installation thereof into the channel 38 formed between the teeth 32, 36 of the ring gear 28. Upon installation of the bushing 89 into the channel 38 of the ring gear 28, the split or open ends are released, which causes the bushing 89 to expand and return to its original shape.

Employing the bushing 89 eliminates a need for a second bearing in the planetary gearbox 10 to rotatably support the second carrier 84 as well as allows for use of the unitary, single-piece ring gear 28. As such, a complexity and manufacturing cost of the planetary gearbox 10 is reduced from that of a conventional gearbox. Additionally, use of the bushing 89 in the planetary gearbox 10, instead of a second bearing, allows an outer diameter of the second carrier 84 to be larger than a diameter of a spindle or carrier of the conventional gearbox, thereby improving a strength of the second carrier 84.

Figure 4:
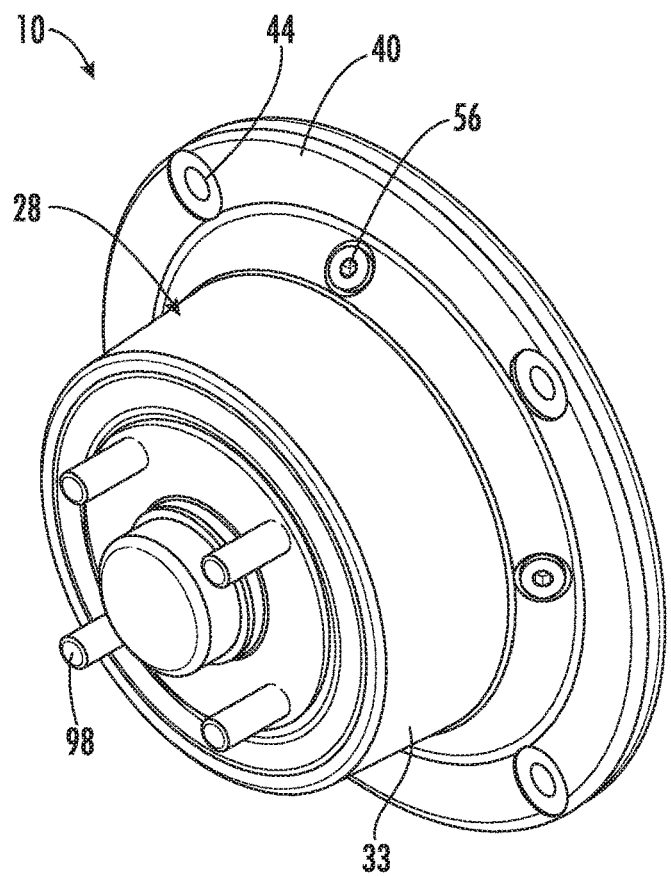
FIG. 4 is a front perspective view of the planetary gearbox shown in FIGS. 1 and 3.
Figure 5:
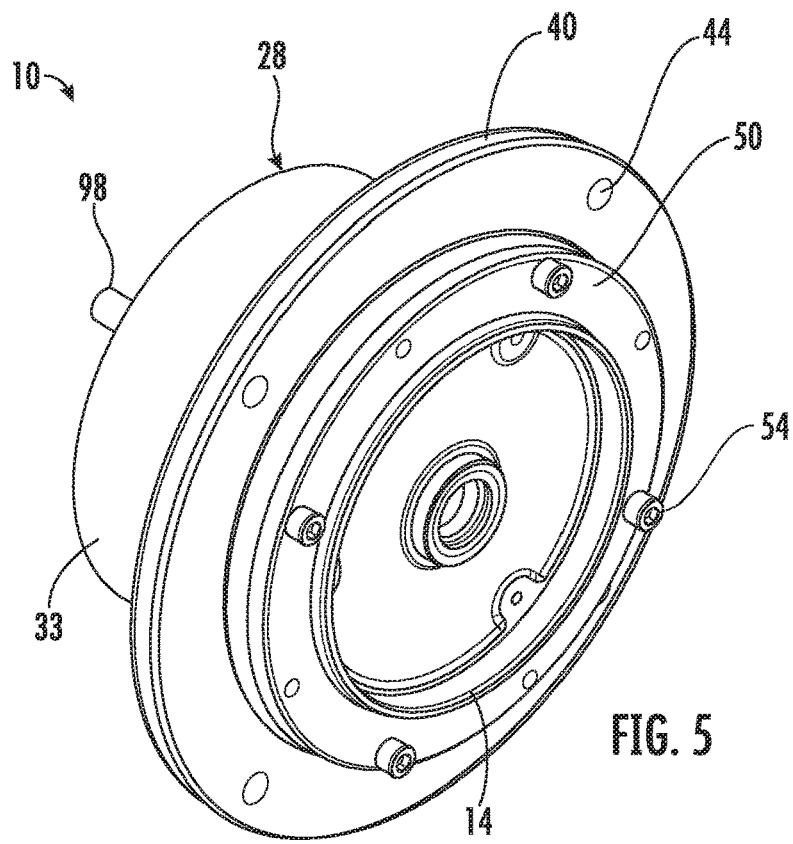
FIG. 5 is a rear perspective view of the planetary gearbox shown in FIGS. 1, 3 and 4.

As more clearly shown in FIGS. 1, 4, and 7, the second carrier 84 may further include a plurality of projections 98 extending outwardly therefrom in the second axial direction away from the interior 17 of the planetary gearbox 10. In certain embodiments, the projections 98 and the second carrier 84 are configured to receive a working component (not depicted) thereon such as a wheel, for example.

It should be appreciated that the first planetary gear assembly 20 and the second planetary gear assembly 74 are configured to produce a certain gear ratio between the prime mover and the second carrier 84. In certain embodiments, the first planetary gear assembly 20 and the second planetary gear assembly 74 are configured to produce a reduction in the gear ratio between the prime mover and the second carrier 84. It is understood, however, that the reduction in the gear ratio between the prime mover and the second carrier 84 depends upon which one of the first sun gear 18, the first planet gears 22, and the ring gear 28 is operatively connected to the prime mover, which one of the first sun gear 18, the first planet gears 22, and the ring gear 28 is stationary, and which one of the first sun gear 18, the first planet gears 22, and the ring gear 28 is operatively connected to the second planetary gear assembly 74. It is further understood that the reduction in the gear ratio between the prime mover and the second carrier 84 also depends upon which one of the second sun gear 72, the second planet gears 76, and the ring gear 28 is operatively connected to the first planetary gear assembly 20, which one of the second sun gear 72, the second planet gears 76, and the ring gear 28 is stationary, and which one of the second sun gear 72, the second planet gears 76, and the ring gear 28 is operatively connected to the second carrier 84.

Figure 2:
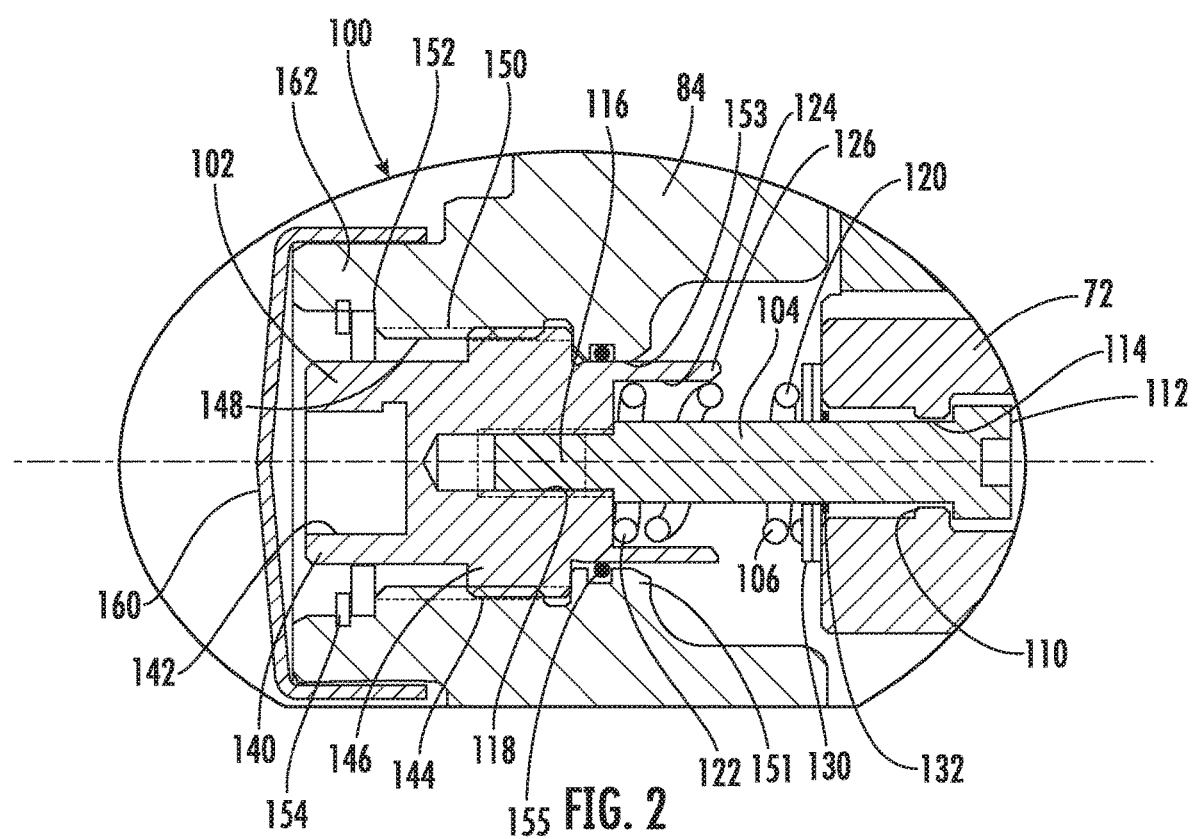
FIG. 2 is an enlarged fragmentary view of a disconnect assembly of the planetary gearbox shown within the circled area of FIG. 1.
Figure 3:
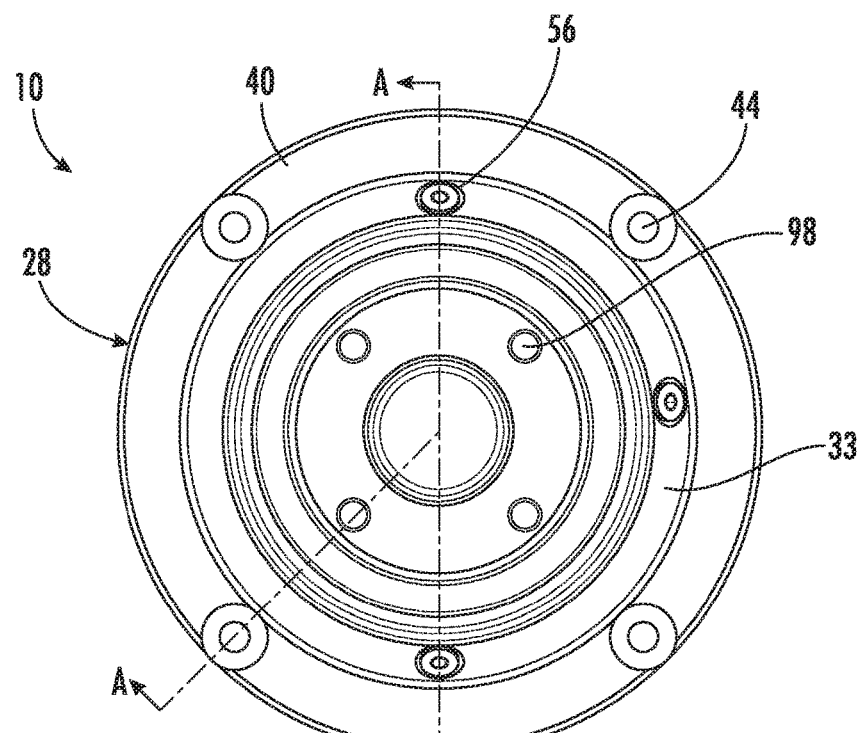
FIG. 3 is a front elevational view of the planetary gearbox shown in FIG. 1.
Figure 13:
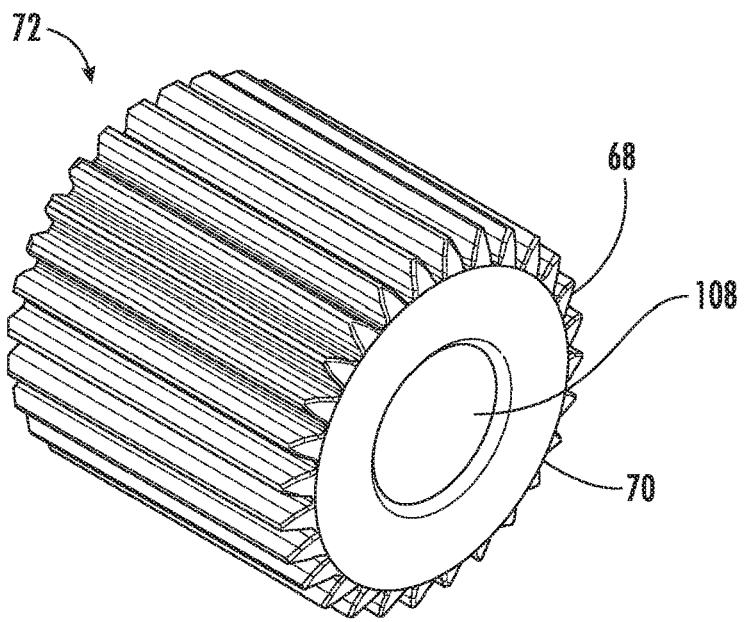
FIG. 13 is a rear perspective view of a sun gear of the planetary gearbox shown in FIGS. 1 and 2.
Figure 14:
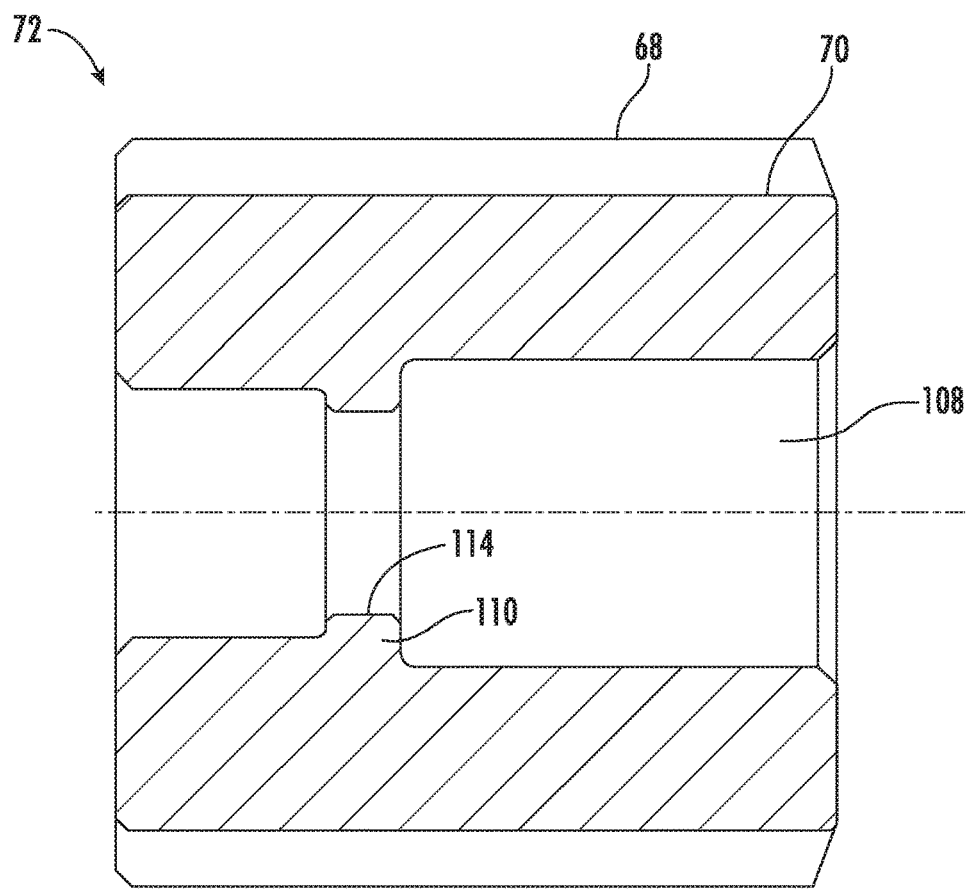
FIG. 14 is a cross-sectional view of the sun gear of the planetary gearbox shown in FIGS. 1 and 2.

As illustrated in FIGS. 1 and 2, the planetary gearbox 10 further includes a disconnect assembly 100. In certain embodiments, the disconnect assembly 100 includes the second sun gear 72, a movable disconnect member 102, a connecting member 104, and at least one biasing member 106 (e.g. a helical spring). As shown in FIGS. 13 and 14, the second sun gear 72 includes a center bore 108, which is configured to receive at least a portion of the connecting member 104 therein.

A linear stop 110 comprising an array of projections or a continuous annular projection may be formed to radially, inwardly extend into the center bore 108 of the second sun gear 72. The linear stop 110 is configured to limit a movement of the connecting member 104 in the second axial direction within the second sun gear 72 and to prevent the connecting member 104 from being entirely separated from the second sun gear 72 during an operation of the disconnect assembly 100. More particularly, a diameter of a first end 112 of the connecting member 104 is greater than a diameter of the opening 114 defined by the linear stop 110.

Figure 12:
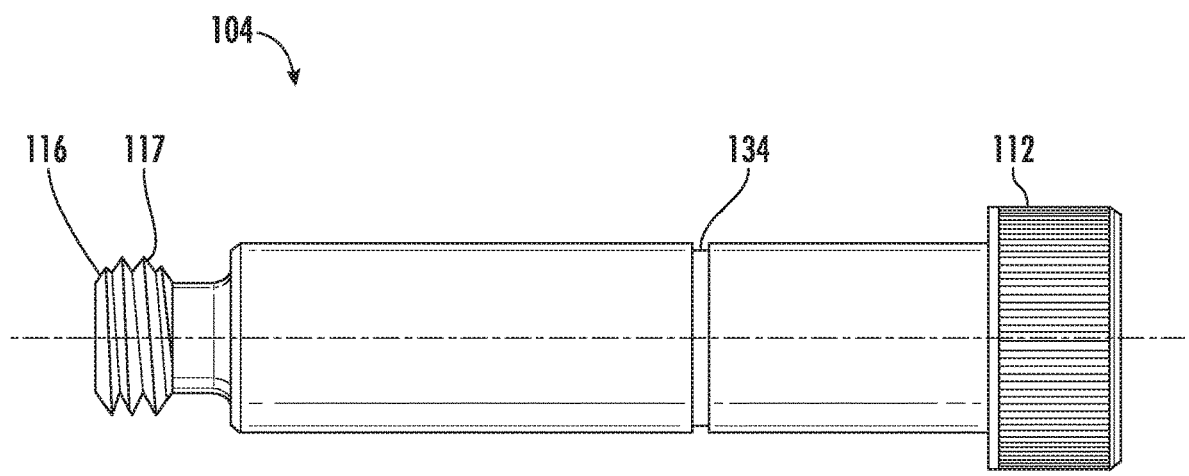
FIG. 12 is a side elevational view a connecting member of the disconnect assembly shown in FIGS. 1 and 2.

A second end 116 of the connecting member 104 is fixedly coupled to the disconnect member 102. In certain embodiments, the second end 116 of the connecting member 104 may be coupled to the disconnect member 102 via a threaded connection. The threaded connection is formed by a plurality of external threads 117 formed on the second end 116 and configured to engage a plurality of internal threads of an aperture 118 formed in the disconnect member 102. Although the second end 116 of the connecting member 104 shown in FIG. 12 has three external threads 117, it is understood that the second end 116 may have any number of external threads 117 as desired. It is further understood that the disconnect member 102 may have any number of internal threads as desired. A locker (not depicted) such as a locking fluid or adhesive may be applied to the threaded connection between the connecting member 104 and the disconnect member 102 to militate against a decoupling thereof. Various other methods may be employed to couple the connecting member 104 to the disconnect member 102 such as a press fit, and interference fit, a weld, a mechanical fastener, a liquid fastener, and the like, for example.

As illustrated, the biasing member 106 is disposed between the second sun gear 72 and the disconnect member 102. The biasing member 106 is configured to provide an urging force against the second sun gear 72. In certain embodiment, a first end 120 of the biasing member 106 is disposed adjacent the second sun gear 72 and a second end 122 is received into a cavity 124 formed in a first end 126 of the disconnect member 102. A thrust element 130 (i.e. thrust washer) and a retaining element 132 (e.g. snap ring) may be interposed between the second sun gear 72 and the biasing member 106 to militate against a movement of the biasing member 106 in the first axial direction and maintain a position thereof. In one embodiment, at least one of the thrust element 130 and the retaining element 132 is received into an annular groove 134, shown in FIG. 12, formed in the outer surface of the connecting member 104 to militate against a movement of the connecting member 104 in the first axial direction within the second gear 72. It is understood that any number of thrust elements 130 and retaining elements 132 may be employed as desired. For example, the embodiment shown in FIG. 2 includes a pair of thrust elements 130.

Figure 9:
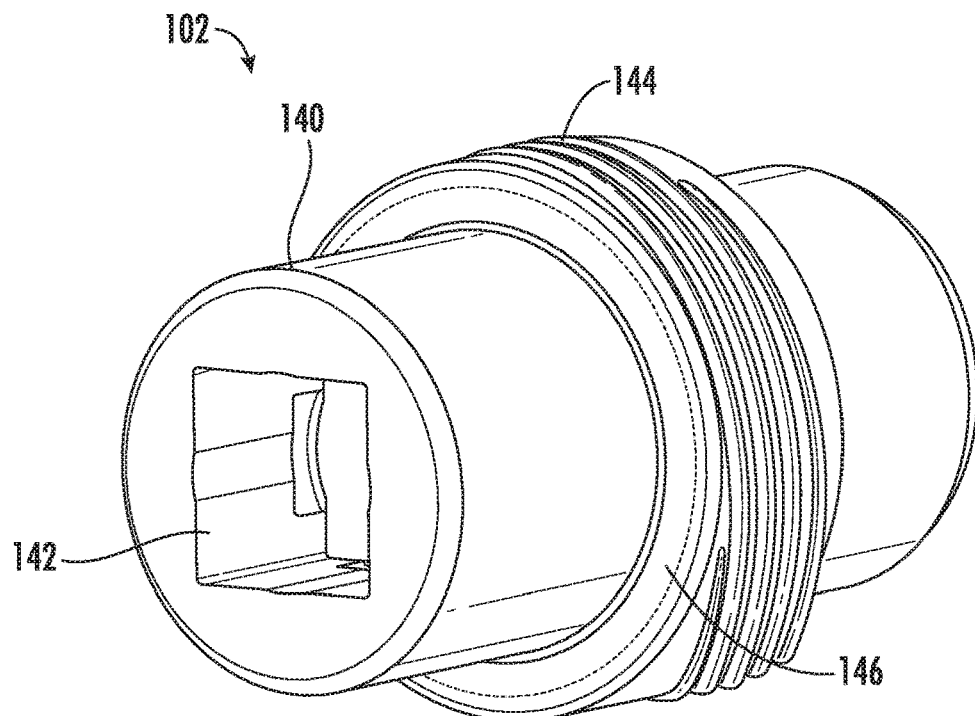
FIG. 9 is a front perspective view of a disconnect member of the disconnect assembly shown in FIGS. 1 and 2.
Figure 10:
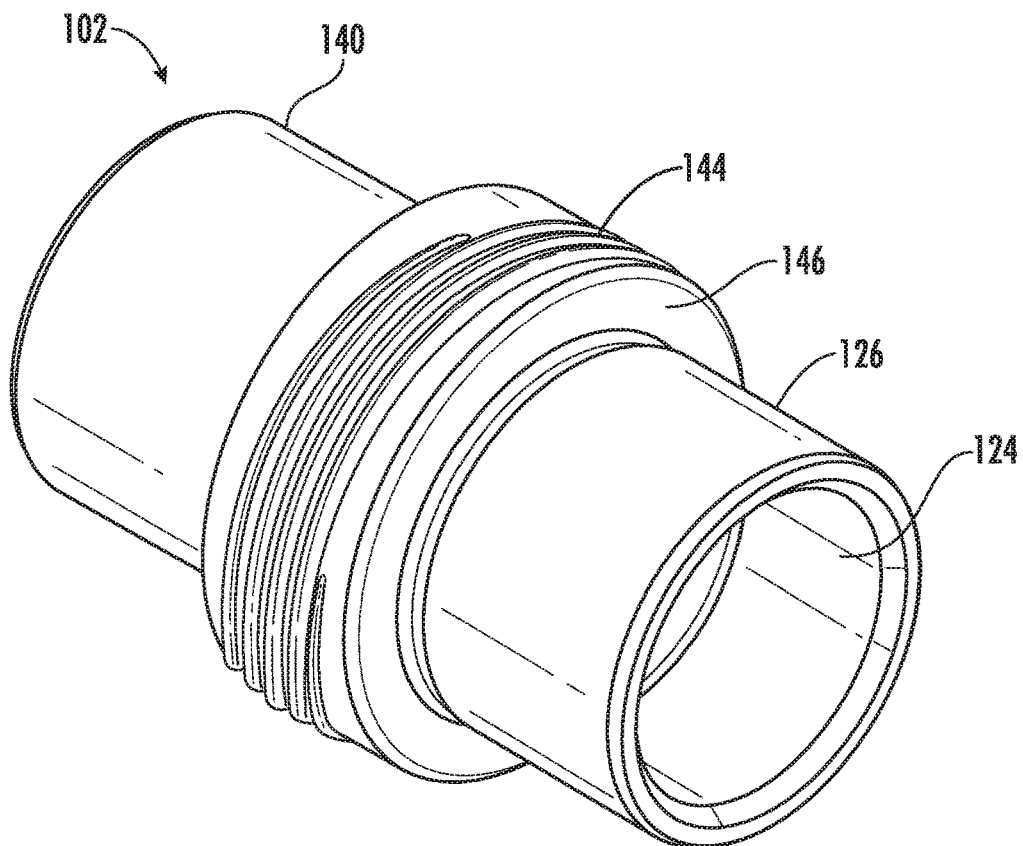
FIG. 10 is a rear perspective view of the disconnect member of the disconnect assembly shown in FIGS. 1-2 and 9.
Figure 11:
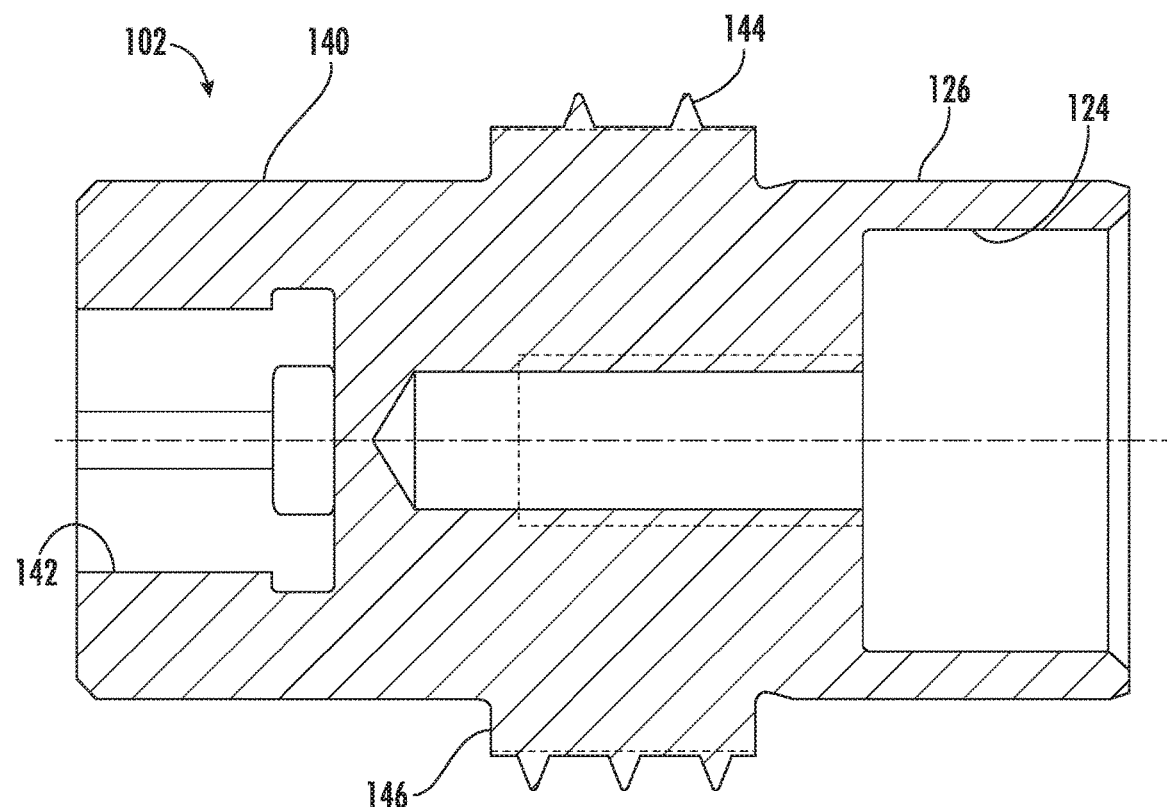
FIG. 11 is a cross-sectional view of the disconnect member of the disconnect assembly shown in FIGS. 1-2 and 9-10.

A second end 140 of the disconnect member 102 may be configured to be removably coupled to an actuator (not depicted) for actuation of the disconnect assembly 100. In certain embodiments, the disconnect member 102 includes an actuator input or opening 142, shown in FIGS. 9 and 11, configured to removably receive at least a portion of the actuator (i.e. an impact driver) therein. It should be appreciated that any suitable actuator may be employed if desired. As more clearly shown in FIG. 2, the disconnect member 102 is coupled to the second carrier 84 via a threaded connection. The threaded connection is formed by a plurality of external threads 144, shown in FIGS. 9-11, formed on an intermediate portion 146 of the disconnect member 102 which are configured to engage a plurality of internal threads 148 of an aperture 150 formed in the second carrier 84. It should be appreciated that the intermediate portion 146 of the disconnect member 102 may have any number of external threads 144 as desired. Likewise, it should also be appreciated that the second carrier 84 may have any number of internal threads 148 as desired.

A linear stop 151 comprising an array of projections or a continuous annular projection may be formed to radially, inwardly extend into the interior 17 of the planetary gearbox 10. The linear stop 151 is configured to limit a movement of the disconnect member 102 in the first axial direction and to prevent the disconnect member 102 from being entirely separated from the second carrier 82 during an operation of the disconnect assembly 100 as well as to ensure that a position of the second sun gear 72 is maintained during normal operation and upon reconnection after a disconnect event. More particularly, a diameter of the intermediate portion 146 of the disconnect member 102 is greater than a diameter of the opening 153 defined by the linear stop 151. A sealing element 155 may be interposed between the disconnect member 102 and the second carrier 84 to militate against contaminants and other undesired materials and substances from damaging the disconnect assembly 100 and entering the interior 17 of the planetary gearbox 10 as well as to militate against a leakage of the lubricant therefrom.

A thrust element 152 (i.e. thrust washer) and a retaining element 154 (e.g. snap ring) may be disposed adjacent the intermediate portion 146 to limit a movement of the disconnect member 102 in the second axial direction within the second carrier 84 and to prevent the disconnect member 102 from being entirely separated from the second carrier 84 during an operation of the disconnect assembly 100. A sealing element or cap 160 may be disposed on an end 162 of the second carrier 84 to cover the actuator input 142 and further militate against contaminants and other undesired materials and substances from damaging the actuator input 42 and the disconnect assembly 100 as well as entering the interior 17 of the planetary gearbox 10.

Figure 16:
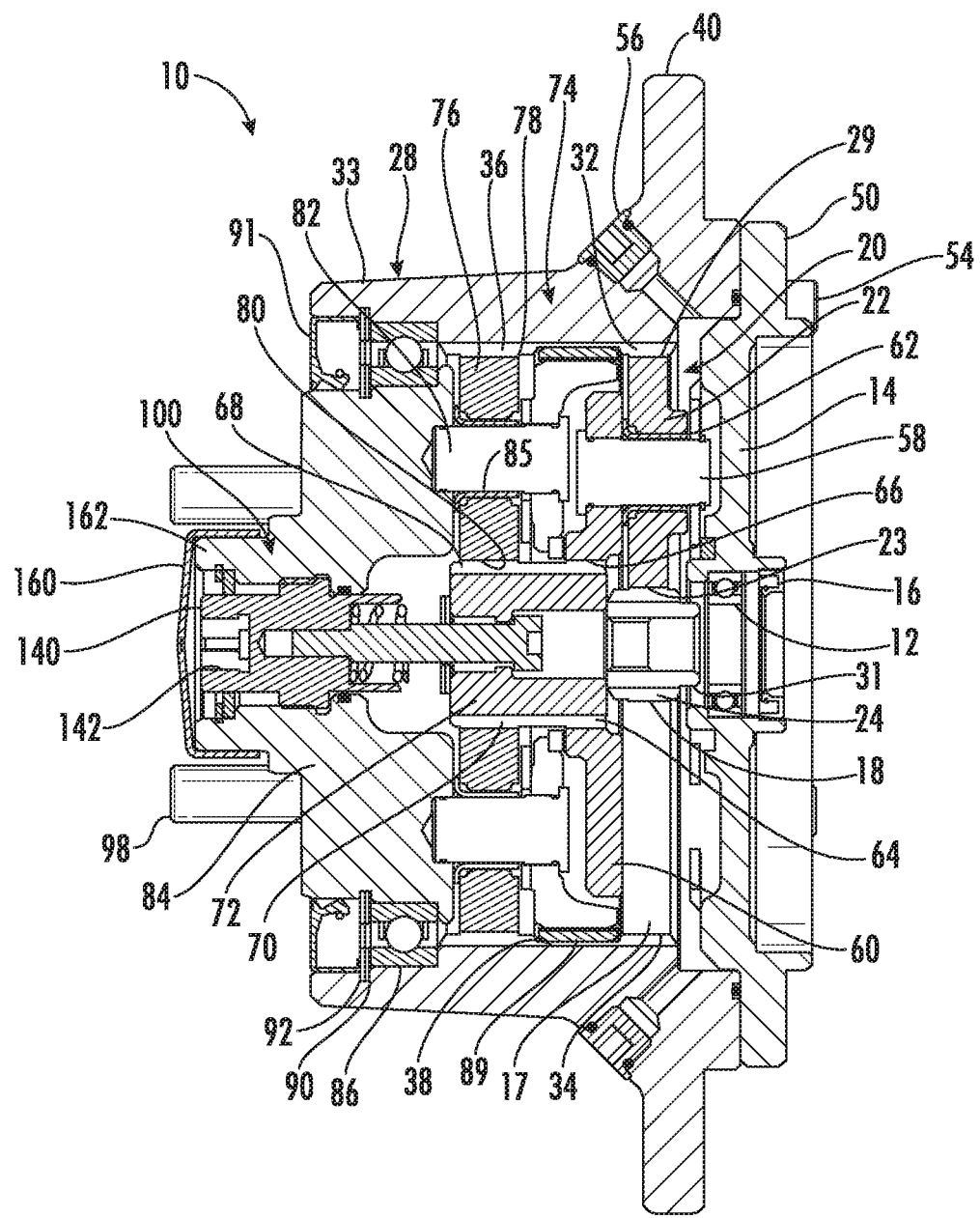
FIG. 16 is a cross-sectional view of the planetary gearbox shown in FIG. 1, wherein the disconnect assembly is illustrated in an engaged position.
Figure 17:
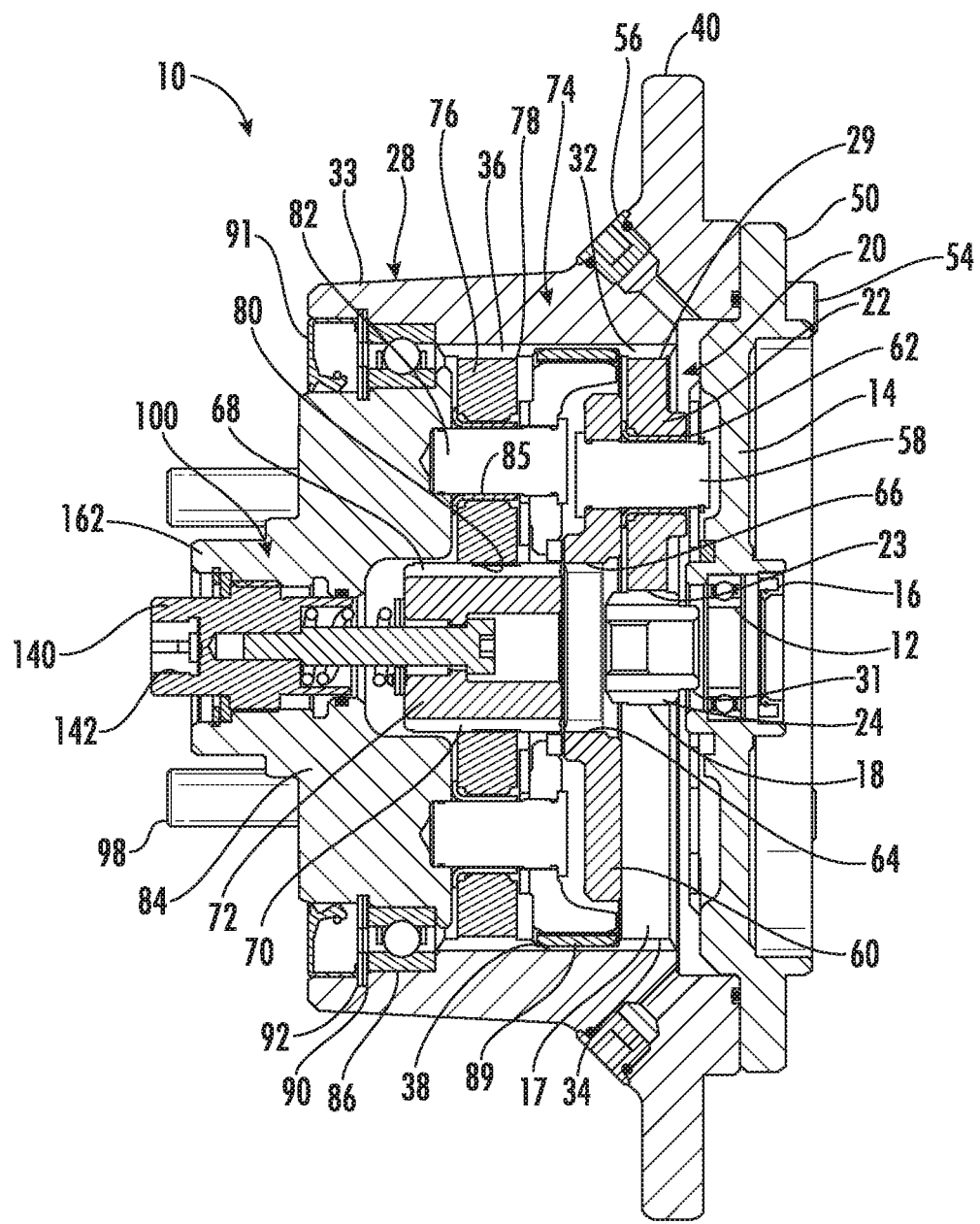
FIG. 17 is a cross-sectional view of the planetary gearbox shown in FIG. 1, wherein the disconnect assembly is illustrated in an opposite disengaged position.
Figure 18:
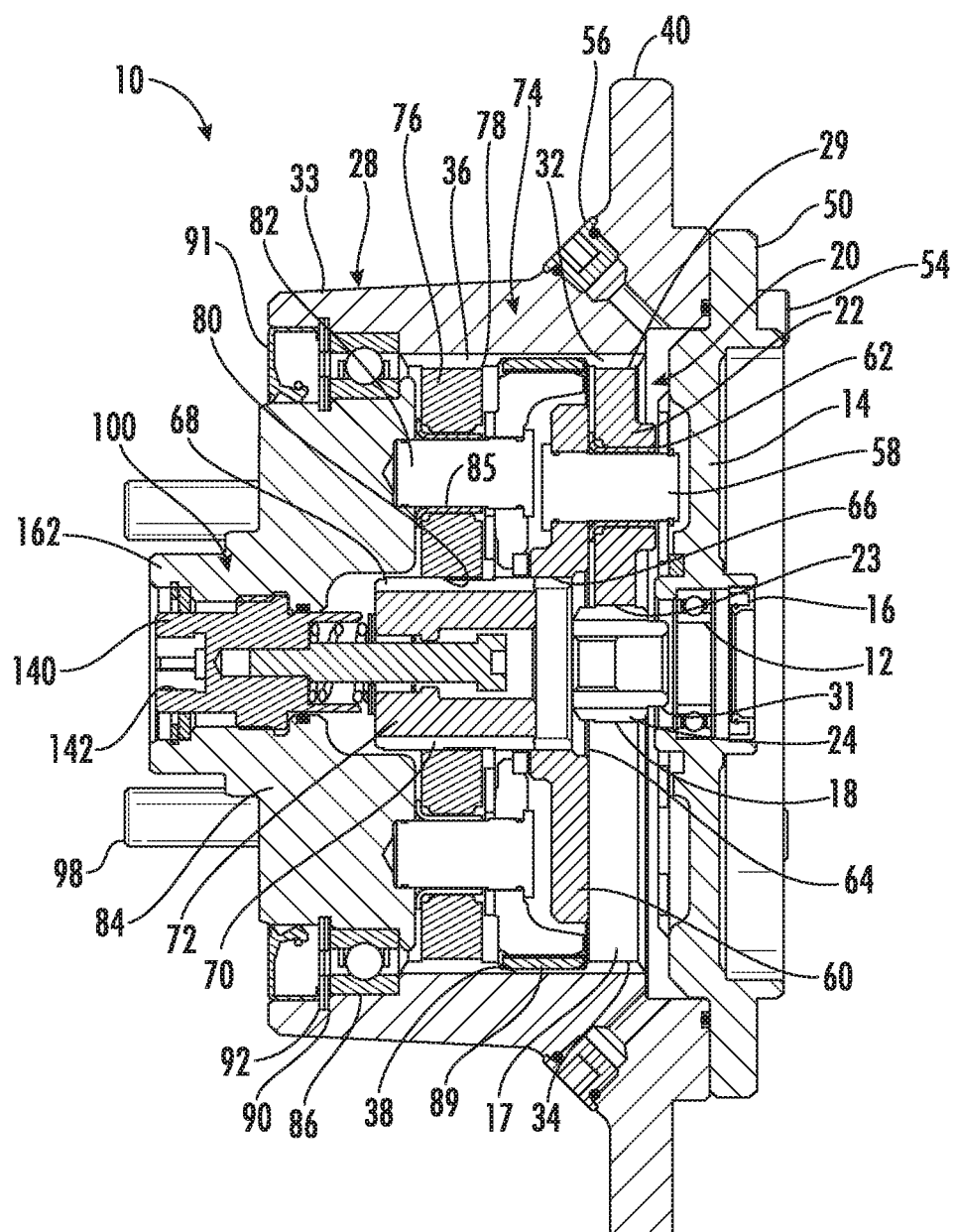
FIG. 18 is a cross-sectional view of the planetary gearbox shown in FIG. 1, wherein the disconnect assembly is illustrated in an intermediate pre-engagement position.

In certain embodiments, the disconnect assembly 100 is selectively positionable between an engaged position as shown in FIG. 16, an opposite disengaged position as shown in FIG. 17, and an intermediate pre-engagement position as shown in FIG. 18.

Referring to FIG. 16, when the engaged position of the disconnect assembly 100 is desired, the actuator is inserted into the actuator input 142 formed in the disconnect member 102. The actuator is activated causing the disconnect member 102 to rotate in a first direction (i.e. clockwise). A rotation of the disconnect member 102 in the first direction causes the disconnect member 102, via the threaded connection, to move in the first axial direction from a position at disengagement of the disconnect assembly 100 to a position at engagement of the disconnect assembly 100. The movement of the disconnect member 102 in the first axial direction also causes the connecting member 104 fixedly coupled thereto to move in the first axial direction. As the connecting member 104 moves the biasing member 106 is applying a force upon the second sun gear 72 in the first axial direction such that the first end 112 of the connecting member 104 abuts the linear stop 110. As such, the second sun gear 72 is also caused to move with the connecting member 104 and the disconnect member 102 in the first axial direction from a disengaged position thereof to an engaged position. The second sun gear 72 in the engaged position is in meshed engagement with both the first carrier 60 and the second planet gears 76. The disconnect member 102 in the position at engagement of the disconnect assembly 100 is threaded into the second carrier 84 such that the intermediate portion 146 abuts the linear stop 151. The engaged position of the second sun gear 72 may be maintained by the biasing member 106 applying a force upon the second sun gear 72 in the first axial direction such that the first end 112 of the connecting member 104 abuts the linear stop 110. Under normal operation, however, the force applied by the biasing member 106 may be countered by the thrust element 130, and therefore, does not cause a substantially constant abutment between the first end 112 of the connecting member 104 and the linear stop 110.

Referring to FIG. 17, when the disengaged position of the disconnect assembly 100 is desired, the actuator is inserted into the actuator input 142 formed in the disconnect member 102. The actuator is activated causing the disconnect member 102 to rotate in a second direction (i.e. counter-clockwise). A rotation of the disconnect member 102 in the second direction causes the disconnect member 102, via the threaded connection, to move in the second axial direction from the position at engagement of the disconnect assembly 100 to the position at disengagement of the disconnect assembly 100. The movement of the disconnect member 102 in the second axial direction also causes the connecting member 104 fixedly coupled thereto to move in the second axial direction. As such, the second sun gear 72 is also caused to move with the connecting member 104 and the disconnect member 102 in the second axial direction from the engaged position thereof to the disengaged position. The second sun gear 72 in the disengaged position is disengaged from the first carrier 60 and in meshed engagement with only the second planet gears 76. The disconnect member 102 in the position at disengagement of the disconnect assembly 100 is threaded in the second carrier 84 such that the intermediate portion 146 abuts the retaining element 154 through the thrust element 152, which forms a substantially tight seal with the disconnect member 102 to militate against contaminants and debris ingression during a period that the disconnect assembly 100 is in the disengaged position such as during a towing operation, for example.

Referring to FIG. 18, when the disconnect assembly 100 is in the intermediate pre-engagement position, the disconnect member 102 is in the position at disengagement of the disconnect assembly 100 being threaded into the second carrier 84 such that the intermediate portion 146 abuts the linear stop 151 and the second sun gear 72 is in the disengaged position being disengaged from the first carrier 60 and in meshed engagement with only the second planet gears 76. However, the teeth 68 of the second sun gear 72 are misaligned with the teeth 64 of the first carrier 60 preventing a movement of the second sun gear 72 in the first axial direction and the meshed engagement therebetween. As such, the biasing member 106 is compressed between the second sun gear 72 and the disconnect member 102 applying a force upon the second sun gear 72 in the first axial direction. Upon alignment of the teeth 64, 68, the force applied by the biasing member 106 will cause the second sun gear 72 to move in the first axial direction from the disengaged position to the engaged position, resulting in meshed engagement between the second sun gear 72 and the first carrier 60.

It should be appreciated that a user may use the actuator to selectively position the disconnect assembly 100. Various other means of actuation may be employed to selectively position the disconnect assembly 100.

During normal operation when the disconnect assembly 100 is in the engaged position (i.e. normal mode or ON mode), the prime mover causes the rotatable shaft and the first sun gear 18 of the first planetary gear assembly 20 coupled thereto, to rotate therewith. Torque is transferred from the prime mover to the first sun gear 18. A rotation of the first sun gear 20 drives the first planet gears 22 and the first carrier 60 coupled thereto. As such, the torque from the first sun gear 18 is then transferred to the first carrier 60 via the first planet gears 22. A rotation of the first carrier 60 causes the second sun gear 72 of the second planetary gear assembly 74 to rotate therewith. The torque is then transferred from the first carrier 60 to the second sun gear 72. A rotation of the second sun gear 72 drives the second planet gears 76 and the second carrier 84 coupled thereto. As such, the torque from the second sun gear 72 is then transferred to the second carrier 84 via the second planet gears 76. A rotation of the second carrier 84 causes the working component (i.e. the wheel) to rotate therewith. The rotation of the second carrier 84 transfers the torque from the second carrier 84 to the working component. An amount of torque transferred from the first sun gear 18 to the working component is increased because of the first and second planetary gear assemblies 20, 74.

During operation when the disconnect assembly 100 is in the disengaged position (i.e. a towing mode or OFF mode), the prime mover causes the rotatable shaft and the first sun gear 18 of the first planetary gear assembly 20 coupled thereto, to rotate therewith. Torque is transferred from the prime mover to the first sun gear 18. A rotation of the first sun gear 20 drives the first planet gears 22 and the first carrier 60 coupled thereto. As such, the torque from the first sun gear 18 is then transferred to the first carrier 60 via the first planet gears 22. However, a rotation of the first carrier 60 does not cause the second sun gear 72 of the second planetary gear assembly 74 to rotate therewith since the second sun gear 72 is in the disengaged position and separated from the first carrier 60. Thus, the torque is not transferred from the first carrier 60 to the second sun gear 72. Further, any rotation of the working component does not transfer torque back through the planetary gearbox 10 since the working component and the second planetary gear assembly 74 coupled thereto are allowed to free-wheel by having the disconnect assembly 100 in the disengaged position.

During operation when the disconnect assembly 100 is in the intermediate, pre-engagement position, the prime mover causes the rotatable shaft and the first sun gear 18 of the first planetary gear assembly 20 coupled thereto, to rotate therewith. Torque is transferred from the prime mover to the first sun gear 18. A rotation of the first sun gear 20 drives the first planet gears 22 and the first carrier 60 coupled thereto. As such, the torque from the first sun gear 18 is then transferred to the first carrier 60 via the first planet gears 22. However, a rotation of the first carrier 60 does not cause the second sun gear 72 of the second planetary gear assembly 74 to rotate therewith since the second sun gear 72 is in the disengaged position and separated from the first carrier 60. Thus, the torque is not transferred from the first carrier 60 to the second sun gear 72. However, any subsequent rotation of the rotatable shaft coupled to the prime mover, causes a rotation of the first planetary gear assembly 20 and thereby the first carrier 64, which eventually results in an alignment of the teeth 64 of the first carrier 64 with the teeth 68 of the second sun gear 72. Alternatively, any subsequent rotation of the working component causes the second carrier 84 and the planet gears 76 of the second planetary gear assembly 74 coupled thereto, to rotate, which eventually results in the alignment of the teeth 64 of the first carrier 60 with the teeth 68 of the second sun gear 72. Once the teeth 64, 68 are in alignment, the force applied by the biasing member 106 will then cause the second sun gear 72 to move in the first axial direction from the disengaged position to the engaged position, resulting in meshed engagement between the second sun gear 72 and the first carrier 60.

One or more features of the embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A disconnect assembly, comprising:
    a disconnect member, wherein the disconnect member includes external threads formed thereon; and
    a connecting member including a first end and a second end, wherein the first end is coupled to the disconnect member and the second end is coupled to an axially movable sun gear of a planetary gear assembly, wherein the external threads of the disconnect member cooperate with internal threads formed on a carrier of the planetary gear assembly.

2. The disconnect assembly of claim 1, wherein the disconnect member is selectively positionable by an actuator.

3. The disconnect assembly of claim 1, further comprising a biasing member disposed between disconnect member and the planetary gear assembly.

4. The disconnect assembly of claim 3, wherein the biasing member is circumferentially disposed about the connecting member.

5. A planetary gearbox, comprising:
    a planetary gear assembly including a movable sun gear, a carrier, at least one planet gear coupled to the carrier, and a ring gear; and
    a disconnect assembly including a disconnect member and a connecting member, wherein the disconnect member is threadably coupled to the carrier of the planetary gear assembly, and wherein the connecting member is coupled to the disconnect member and the movable sun gear.

6. The planetary gearbox of claim 5, wherein the disconnect assembly is selectively positionable between an engaged position and a disengaged position, wherein the disconnect assembly in the engaged position permits torque to be transferred through the planetary gear assembly to a working component, and wherein the disconnect assembly in the disengaged position permits the working component to free wheel without torque being transferred to the planetary gear assembly.

7. The planetary gearbox of claim 5, further comprising a biasing member disposed between the disconnect member and the movable sun gear of the planetary gear assembly.

8. The planetary gearbox of claim 7, wherein the biasing member is circumferentially disposed about the connecting member.

9. A planetary gearbox, comprising:
    a first planetary gear assembly including a first sun gear, a first carrier, at least one first planet gear coupled to the first carrier, and a ring gear;
    a second planetary gear assembly including a movable second sun gear coupled to the first planetary gear assembly, a second carrier, at least one second planet gear coupled to the second carrier, and the ring gear; and
    a disconnect assembly including a disconnect member and a connecting member, wherein the disconnect member is coupled to the second carrier of the second planetary gear assembly, and wherein the connecting member is coupled to the disconnect member and the movable second sun gear, wherein the disconnect member is threadably coupled to the second carrier of the second planetary gear assembly.

10. The planetary gearbox of claim 9, wherein the second carrier of the second planetary assembly includes a linear stop formed thereon.

11. The planetary gearbox of claim 9, wherein the disconnect member is selectively positionable by an actuator.

12. The planetary gearbox of claim 9, wherein the connecting member includes a first end, an opposite second end, and a groove formed therebetween.

13. The planetary gearbox of claim 9, wherein the movable second sun gear includes a linear stop formed thereon.

14. The planetary gearbox of claim 9, wherein the movable second sun gear is selectively positionable between an engaged position and a disengaged position.

15. The planetary gearbox of claim 14, wherein the movable second sun gear in the engaged position is in meshed engagement with the first carrier of the first planetary gear assembly and the at least one second planet gear of the second planetary gear assembly.

16. The planetary gearbox of claim 14, wherein the movable second sun gear in the disengaged position is in meshed engagement with the at least one second planet gear of the second planetary gear assembly and separated from the first carrier of the first planetary gear assembly.

17. The planetary gearbox of claim 9, further comprising a biasing member having a first end disposed adjacent the movable second sun gear of the second planetary gear assembly and a second end disposed in a portion of the disconnect member.

\* \* \* \* \*